United States Patent

[11] 3,587,769

| [72] | Inventor | John G. Lotter |
| --- | --- | --- |
| | | 7843 Elmgrove Drive, Elmwood Park, Ill. 60635 |
| [21] | Appl. No. | 799,875 |
| [22] | Filed | Feb. 17, 1969 |
| [45] | Patented | June 28, 1971 |

[54] VEHICLE SPEED CONTROL SYSTEM
4 Claims, 4 Drawing Figs.

[52] U.S. Cl. ............................................. 180/98
[51] Int. Cl. ............................................. B60k 31/00
[50] Field of Search ................................ 180/98, 82(E), 105; 246/182, 63, 29, 30; 123/102

[56] References Cited
UNITED STATES PATENTS

| 2,469,779 | 5/1949 | Nowalk | 180/109 |
| --- | --- | --- | --- |
| 2,656,002 | 10/1953 | Keeton et al. | 180/98X |
| 2,780,300 | 2/1957 | Beyer | 180/98X |
| 3,007,538 | 11/1961 | Hill | 180/98 |
| 3,195,671 | 7/1965 | Wolfe | 180/98 |
| 3,368,639 | 2/1968 | Deane | 180/98 |
| 3,378,102 | 4/1968 | Collin et al. | 180/98 |

Primary Examiner—Kenneth H. Betts
Attorney—Cornelius J. O'Connor

ABSTRACT: An automatic control system for a motor vehicle having adjustable speed control apparatus comprises one or more radio frequency transmitters, the outputs of which are modulated by command signals of predetermined different frequencies individually identified with an assigned speed limit. A receiver carried by the vehicle includes a demodulator for detecting the command signals, a signal translating circuit for developing a control signal and an electromechanical device which engages the speed control apparatus upon receipt of a command signal to restrict the speed of the vehicle to the speed limit assigned to the command signal. The output of the signal-translating circuit is coupled to the electromechanical device by means responsive to the speed of the vehicle and, for emergency purposes, operator controllable means are provided to permit disengaging the electromechanical device from the speed control apparatus for a predeterminable period.

Inventor
John G. Lotter
By Cornelius J. O'Connor
Attorney

VEHICLE SPEED CONTROL SYSTEM

BACKGROUND OF THE INVENTION

This invention relates in general to control systems and in particular to an arrangement for automatically controlling, remotely, the speed of a moving self-propelled vehicle, such as an automobile.

The tragic toll daily wrought by speeding vehicles on the nation's highways need not be documented here. Moreover, the ever expanding growth of the country can only serve to worsen this toll as roads become more congested and vehicular power goes substantially unchecked. This is especially true where roads designed for high speeds enter centers of population and, in particular, sparsely populated communities which can ill afford either adequate police protection or traffic control equipment.

The surveillance of motor vehicles that travel our roads is, for the most part, entrusted to law enforcement agencies that patrol the roads or monitor, via radar, the traffic from some vantage point. A shortcoming of this system, insofar as speeding vehicles is concerned, resides in the fact that the vehicle operator has already violated the law before he is detected, and will probably continue to do so, before corrective measures are brought to bear by the police.

Not infrequently, present day measures intended to enforce speed limits unwittingly contribute to the highway toll when a speeding driver, either through panic or misguided bravado, attempts to escape only to cause an accident involving unwary and innocent third parties, as well as himself. The high speed chase is not the solution; even when successfully executed, it is often no more than a temporary setback to the speeder.

It is therefore an object of the invention to provide a control system for automatically controlling the speed of a motor vehicle.

It is another object of the invention to maintain effective speed control of a vehicle within a monitored area.

It is a specific object of the invention to automatically control the speed of a motor vehicle by means of a radio link between the vehicle and a command station.

It is also an object of the invention to provide an automatic speed control system for a motor vehicle which can be temporarily overridden by the vehicle operator during a period of emergency.

It is still another object of the invention to provide an automatic speed control system for a motor vehicle which does not adversely affect the performance capabilities of the vehicle.

SUMMARY OF THE INVENTION

A control system for use with a motor-propelled vehicle having adjustable apparatus for controlling the speed of the vehicle, and constructed in accordance with the invention, comprises means for transmitting a radio frequency signal that is modulated by a command signal. Means are borne by the vehicle for receiving the transmitted radio signal. A demodulator is coupled to the receiving means for detecting the command signal. The output of the demodulator, in turn, is coupled to a signal-translating circuit which develops a control signal. An electromechanical device, which is coupled to the output of the signal translating circuit, engages the speed-controlling apparatus upon receipt of the control signal to restrict the speed of the vehicle to an assigned velocity within a given area. The aforesaid velocity is determined by a frequency characteristic of the command signal. Means responsive to the speed of the vehicle are also included for effecting a coupling between the output of the signal-translating circuit and the electromechanical device. Finally, means, controllable by the operator of the vehicle, are provided for disengaging the electromechanical device from the speed control apparatus for a predeterminable period.

The features of the invention which are believed to be novel are set forth with particularity in the appended claims. The invention, together with further objects and advantages thereof, may best be understood, however, by reference to the following description taken in conjunction with the accompanying drawing, in the several FIGS. of which like reference numerals identify like elements, and in which:

Figure 1:
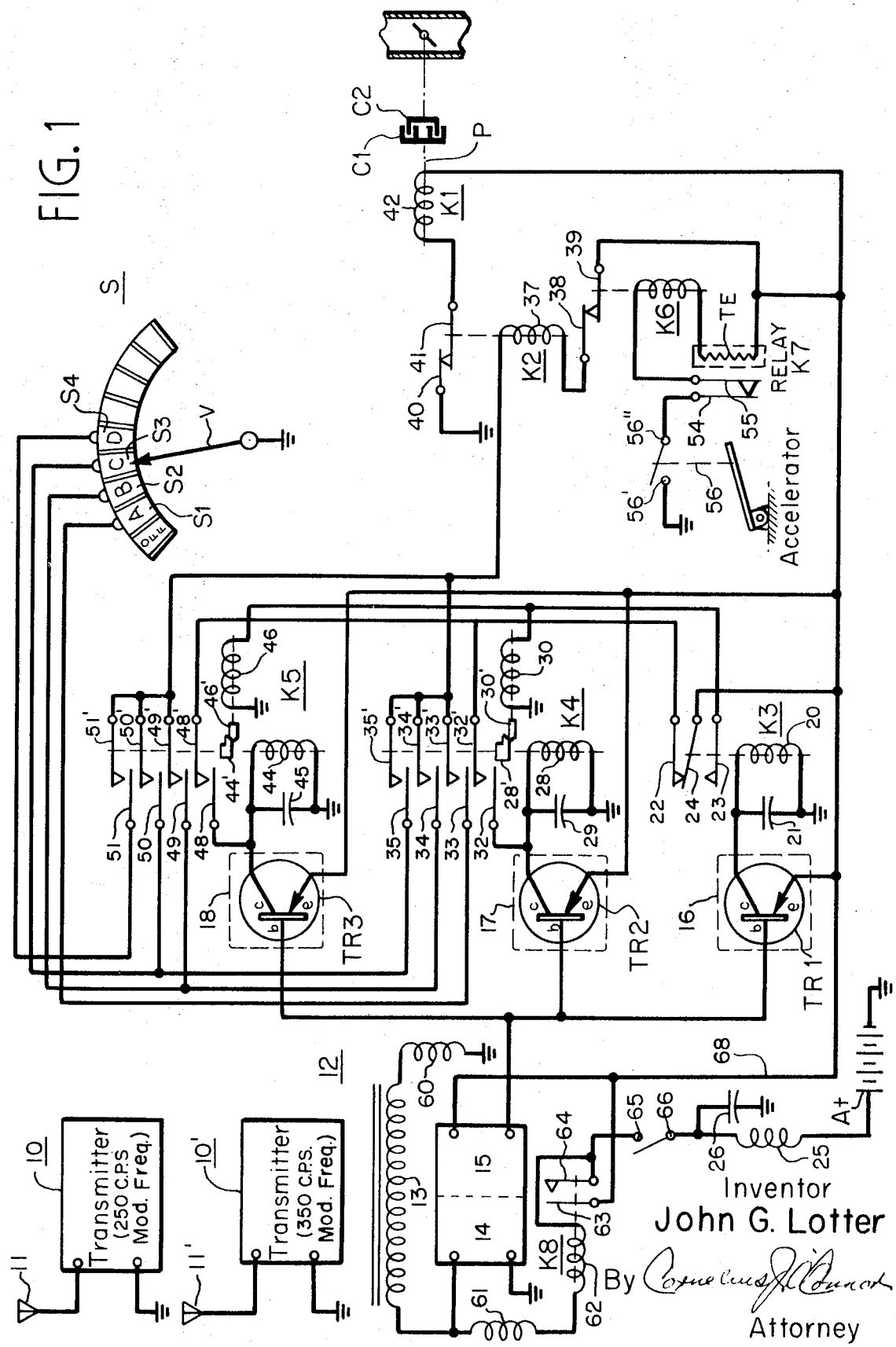
FIG. 1 is a schematic representation of a speed control system embodying the invention.

Referring now to FIG. 1 the subject control system is seen to comprise one or more radiofrequency transmitter stations 10, 10' of relatively low power output and having respective antennas 11, 11' individually assigned to areas where a predetermined vehicular velocity is to be maintained. The transmitter antennas are positioned adjacent the roadway area in the assigned area and in an orientation complementary to that of a receiving antenna borne by a vehicle to be controlled. It is appreciated that, in its most general application, the vehicles contemplated by the invention include automobiles trucks and buses, however, the invention is equally applicable to vehicles that do not operate on the public roadway, such as material-handling vehicles, e.g., forklift trucks, that operate principally in private, and pedestrian travelled, area ways. In order to prevent "masking" of a transmitted signal by another vehicle, as well as for purposes of security, it is contemplated that the transmitting antennas be secreted beneath the roadway.

Station 10 transmits a radiofrequency carrier that is modulated by an audio frequency command signal, a 250 c.p.s. signal, for example, while the carrier of station 10' is assigned a different modulating frequency, say 350 c.p.s. For purposes of illustrating the invention, it will be assumed that station 10 is located in an area or zone where the maximum speed limit is to be restricted to 25 m.p.h. while station 10' is located in an area having an upper speed limit of 35 m.p.h. Neither the type of carrier modulation employed nor the frequency of the modulating signal is of any particular consequence insofar as the invention is concerned. Accordingly, the transmitter carrier may be amplitude, frequency or phase modulated by a command signal of any desired frequency.

The control system of FIG. 1 further includes a receiver 12 which is borne by the vehicle to be controlled. To this end receiver 12 comprises an antenna 13 which is coupled to a radiofrequency tuner and amplifier 14. Preferably, antenna 13 comprises a ferrite loop device which is protectively encased within a nonmetallic, tamperproof housing secured beneath the vehicle or other suitable location thereon. The mounting and orientation of the antenna is selected to effect maximum signal capture when within the range of a transmitting antenna.

One end of antenna 13 is connected to ground through a choke coil 60 while its other terminal is applied to the tuner input of the receiver and, through a second choke coil 61, to a source of energizing potential. Chokes 60, 61 and antenna 13 afford a DC ground return path for the energizing coil 62 of a relay K8 having a pair of normally open contacts 63, 64. Contact 63 is connected to a conductor 68 which provides "A" battery potential to the various stages of the receiver including a relay K1. Contact 64 is connected to one terminal of coil 62 and to a fixed contact 65. A movable contact 66, engageable with contact 65, completes the energizing circuit between relay coil 62 and battery A through a filter circuit comprising a choke 25 and a capacitor 26. Contact 66 is preferably associated with the vehicle's ignition switch so that relay K8 is automatically energized when that switch is actuated. The purpose of grounding coil 62 through antenna 13 is to prevent a defeat of the control system by removing the antenna, or receiver 12, for that matter, since removal of either would "open" the energizing path between battery "A" and the energizing coil 42 of the solenoid K1, the significance of which solenoid will be explained below. Suffice it to say, at this juncture that if solenoid K1 is not energized, the vehicle's engine cannot be started.

The output of tuner 14 is coupled to a demodulator 15 which detects the audio command signal. The output of the demodulator, in turn, is coupled to the input of a master audio amplifier 16, as well as to the inputs of one or more command amplifiers. For purposes of illustration only two command amplifiers are disclosed, namely, a first amplifier 17 tuned to translate only audio signals in the immediate vicinity of 250 c.p.s. and a second amplifier 18 responsive only to signals in the vicinity of 350 c.p.s. Amplifier 16, on the other hand, has a pass band acceptable to all signals employed as modulating command signals by the transmitters.

The output stage of amplifier 16 comprises a PNP transistor TR1, having an input or base electrode $b$ and a pair of output electrodes that include a collector $c$ which is connected to the energizing coil 20 of a master control relay K3 and an emitter $e$ which is returned to the "A" battery. Coil 20 is shunted by a capacitor 21 that is charged by the pulsating output of TR1, which is preferably operated in a Class "B" mode, to maintain coil 20 energized in the presence of an output signal from TR1. Relay K3 includes a pair of fixed contacts 22, 23 and a movable contact 24, the latter being returned to the source of positive potential, battery A. Relay contacts 22, 24 form a pair of normally closed contacts while contacts 23—24 comprise a normally open pair.

The output stage of amplifier 17 comprises a PNP transistor TR2 also having a base electrode $b$ and a pair of output electrodes including a collector $c$, connected to the ungrounded terminal of the energizing coil 28 of a latch-type control relay K4, and an emitter $e$ that is returned to battery A. A capacitor 29 is shunted across coil 28 and functions in the same manner as capacitor 21 of relay K3 in that it accumulates a charge in response to a pulsating output from transistor TR2 to maintain coil 28 energized. Relay K4 includes an actuating armature 28' and an unlatching coil 30 that has one terminal maintained at reference potential while another is connectable to battery "A" via contacts 23, 24 of relay K3. An unlatching bar 30' is operatively associated with coil 30 of relay K4. A plurality of pairs of normally open contacts 32–32', 33–33', 34–34', 35–35' are associated with relay K4 and are displaced from open positions to closed positions by armature 28' when coil 28 is energized. Contact 32 is connected to the energizing coil 28 of relay K4 while contact 32' is returned to contact 22 of relay K3 to provide holding current for coil 28 of K4. Contact 33, on the other hand, is returned to reference potential through a segmented switch S associated with the speedometer mechanism of the vehicle.

More particularly, switch S can be an integral part of the speedometer and, to this end, comprises a plurality of mutually insulated segments S1, S2, etc., which are positioned for sequential engagement by a movable vane V that is mechanically coupled to the drive cable of the speedometer but is electrically maintained at ground potential. Each of segments S1, S2, etc., correspond to a particular speed of the vehicle and, in the disclosed embodiment, S1 and S2 are assigned to amplifiers 17, 18, respectively, specifically to contacts 33 and 49 of relays K4 and K5. Switch segments S1 and S2 are therefore positioned on switch S to be contacted by vane V at speeds of 25 m.p.h. and 35 m.p.h., respectively. The contact bank for relay K4 also includes the normally open movable contacts 34, 35 which are connected, respectively, to speedometer switch segments S2 and S3. Contact 33' of relay K4 is connected through the energizing coil 37 of a throttle control relay K2 and a pair of normally closed contacts 38, 39 of relay K6 to battery "A." Actually contact 33' is but one of a series of companion contacts 34', 35' which are connected to coil 37. A pair of normally closed contacts 40, 41 are associated with relay K2 and serve to complete a circuit between battery "A" and an actuating coil 42 for an electromechanical throttle control solenoid K1.

Figure 2:
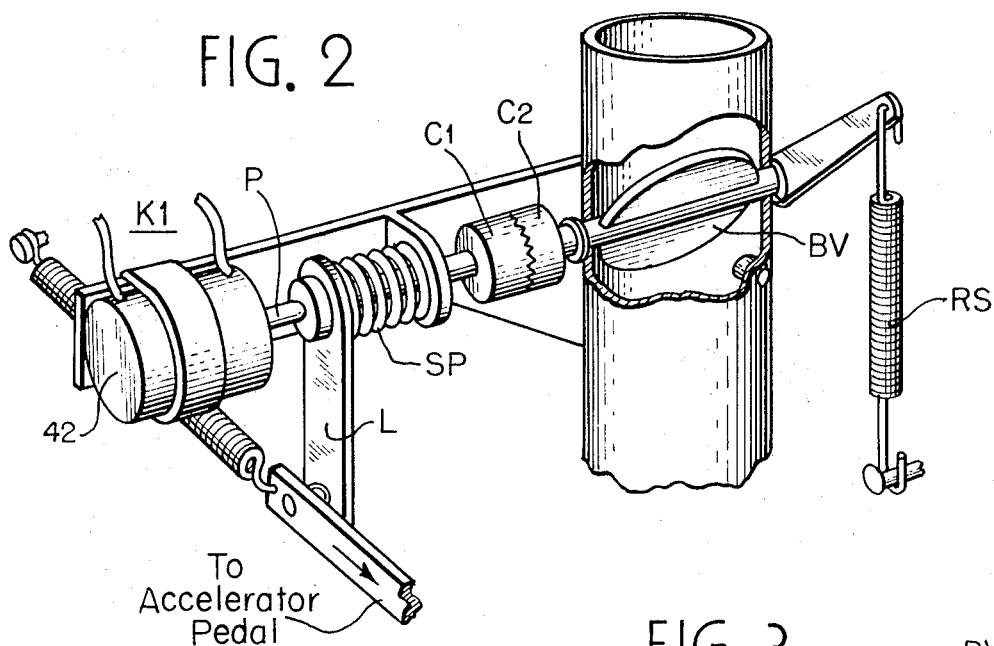
FIG. 2 is a perspective view, partly in section, of a fuel control apparatus utilizable in the speed control system of FIG. 1.

The throttle control referred to above is detailed in FIG. 2 and can comprise a pair of clutch plates C1, C2, one of which, C1, is biased by a spring SP against a displaceable plunger P of solenoid K1 so that when coil 42 is deenergized as by the opening of contacts 40, 41 (or contacts 65, 66), the clutch plates disengage. Plate C1 is also connected by suitable mechanical linkage L to the accelerator pedal on the floorboard of the vehicle. The other clutch plate, C2, is connected to a butterfly valve BV in the throat of the carburetor. This valve is normally biased to a closed position by a return spring RS when clutch plates C1 and C2 are disengaged, as would be the case any time contacts 40, 41 of relay K2 (or contacts 65, 66) are open. It is thus apparent that in order for the accelerator or foot pedal to effect a mechanical coupling to the carburetor butterfly valve, clutch plates C1, C2 must be engaged. This requires that relay K1 be energized which, in turn, requires that relay 37 be deenergized so that contacts 40, 41 may assume their normally closed position. It is recognized, of course, that the speed control member connected to clutch plate C2 can be an element other than the butterfly valve in the throat of a carburetor.

The output of amplifier 18 also comprises a transistor TR3 the collector of which is connected to one terminal of the energizing coil 44 of another latch-type relay K5 having an actuating armature 44'. A capacitor 45 is shunted across coil 44 and serves to accumulate a charge, in response to a pulsating output from transistor TR3, to energize coil 44. Relay K5 also includes an unlatching coil 46 that has an unlatching bar 46' operatively associated therewith. Coil 46 has one terminal grounded and the other connected to contact 23 of relay K3. Relay K5 likewise comprises a plurality of pairs of normally open contacts 48–48', 49–49', 50–50' and 51–51' which are displaceable from their open to closed positions by armature 44' when coil 44 is energized. Contact 48 is connected to the collector of transistor TR3 while contact 48' is returned to contact 22 of master control relay K3 to provide holding current for K5. Contact 49 is returnable to reference potential through segment S2 of speedometer switch S and vane V while contact 49' is connected to the same terminal of coil 37 as contact 33' of relay K4. Contacts 50, 51 of relay K5 are connected, respectively, to speedometer switch segments S3 and S4 while contacts 50' and 51' are connected to energizing coil 37 of relay K2 in the same fashion as contacts 34' and 35' of relay K4. Contact 49', as well as contacts 50', 51', are connected to the energizing coil 37 of relay K2 in the same manner as contacts 33'—35' of relay K4.

OPERATION

The control transistors are disclosed as PNP devices, however, it is appreciated that NPN transistors may be substituted for them by simply making appropriate changes in the polarity of the energizing potentials applied to their electrodes. The control transistors are preferably operated in a Class B mode with the collector drawing current for approximately one-half of each duty cycle. For more efficient operation of their output circuits, that is, a capacitor shunted relay coil, the output signal of the transistor amplifiers is desirably in the form of a clipped sine wave.

Initially, it will be assumed that a vehicle equipped with receiver 12 enters a zone in which the speed limit is 25 m.p.h. As the vehicle enters the zone receiver 12 responds to the 250 c.p.s. modulated carrier signal transmitted by station 10. After demodulation the 250 c.p.s. command signal is applied to the signal-translating circuit of the receiver. Transistors TR1 and TR2 in this circuit develop output signals in their collector circuits in response to the 250 c.p.s. command signal. Considering first transistor TR1, since coil 20 and capacitor 21 are in its collector circuit, current flows through relay coil 20, also charging capacitor 21, energization of coil 20 moves contact 24 into engagement with contact 23 to complete a circuit from battery "A" to unlatching coils 30, 46 of relays K4 and K5. Coils 30, 46 then actuate their unlatching bars 30' and 46' if, at that instant, either had been in a latch position. In this fashion all the latching relays of the receiver are cleared simultaneously thus permitting their contact banks to return to their normally open positions.

Since the transmitter is, as mentioned, a low power and thus a short range station, the output signal from TR1 soon fades and contact 24 of relay K3 then returns to its normal position, that is, in engagement with contact 22. With unlatching coil 30 deenergized, output current of TR2 energizes coil 28 of relay K4, also charging capacitor 29, thereby actuating armature 28' to close contacts 32-32', 33-33', 34-34' and 35-35'. The closure of contacts 32-32' permits application of "A" battery potential to coil 28 thus assuring a positive and continuous energization of relay K4. Concurrently with the closure of the contact bank of relay K4, armature 28' is latched by bar 30'.

At this juncture it should be noted that capacitor 21 across coil 20 is desirably substantially smaller in capacity than either capacitor 29 of relay K4 or capacitor 45 of relay K5. It is preferred that the output circuit of TR1 have a significantly shorter time constant than the time constants for the output circuits of TR2 and TR3.

This is desired in order that, in the presence of a command signal in the outputs of TR1 and TR2, contacts 22, 24 of relay K3 reclose before circuit 28, 29 of relay K4 permits contacts 32, 32' (as well as the remaining contacts in that bank) to open. As a result energizing "A" potential is applied to coil 28 of K4 before contacts 32, 32' can open. In this regard, and in an actual reduction to practice of the invention, capacitor 21 was assigned a value of 10 μf. while each of capacitors 29, 45 comprised 50 μf. units. Accordingly, in the operation under consideration, the longer time constant in the output circuit of amplifier TR2 permitted relay K4 to remain energized until master relay contacts 22, 24 reclosed to apply "A" battery potential to contacts 32, 32'. A purpose in applying energizing "A" potential to relay coil 28 via contacts 32, 32' is in the nature of a safeguard. More particularly, this potential applies a constant bias to armature 28' in order to counter any vibration that might jar the armature from its latched position.

With the bank of contacts for relay K4 closed, the control system is now conditioned to maintain the speed of the vehicle at speeds not appreciably greater than 25 m.p.h. If the operator attempts to exceed 25 m.p.h., the vane V engages speedometer switch segment S1 to complete an energizing circuit for relay K2. This circuit extends from the grounded vane V through relay contacts 33, 33', coil 37 of relay K2 and the normally closed contacts 38, 39 of relay K6 to the "A" battery. Energization of relay K2 causes normally closed contacts 40, 41 to open thereby deenergizing solenoid K1. This, in turn, permits clutch plates C1 and C2 to open and allow spring RS to close the carburetor valve BV. At the same time the accelerator pedal linkage is disconnected from the carburetor valve. Immediately the vehicle slows down and when the speedometer registers less than 25 m.p.h., vane V is removed from switch segment S1, relay K2 is deenergized, contacts 40, 41 reclose and speed control is returned to the vehicle driver.

Thereafter when the vehicle departs from the 25 m.p.h. zone it may enter another speed limit zone, say 35 m.p.h., or it may enter an unrestricted speed zone. In the former case transmitter 10' radiates a carrier modulated by a 350 c.p.s. command signal. This signal, when demodulated, is applied to amplifier TR1 and relay K3 which opens or clears the contact bank of relay K4 and also the contact bank of relay K5. The 350 c.p.s. command signal is, of course, also applied to amplifier TR3 and relay K5 which operate to maintain speed control at 35 m.p.h. in the same manner as previously described amplifier TR2 and relay K4 held the vehicle speed at 25 m.p.h.

In the event an unrestricted zone is entered a transmitter is provided which radiates a command signal that activates only amplifier TR1. In this manner TR1 and relay K3 clear or open the contact banks of relays K4 or K5 and speed control is solely in the hands of the driver since the speedometer switch-grounding segments are disconnected from relay K2.

OVERRIDE MECHANISM

An override mechanism is provided for temporarily defeating the speed control arrangement, for example, in an emergency. To this end there is provided a relay K7 having a thermal element TE which is connected in series with battery "A," the energizing coil of a relay K6, a pair of normally closed contacts 54, 55 and a pair of normally open contacts 56', 56" of an override switch 56. Contact 56" is mechanically linked to the conventional foot control accelerator in the vehicle and is actuated only when the accelerator is temporarily floored. This would be the case if the driver, upon pulling out to pass a slower moving vehicle, momentarily exceeded the speed limit in a speed control zone. Normally, as soon as he exceeded the speed limit relay K2 would become energized and contacts 40, 41 would open to deenergize solenoid K1 and permit clutch plates C1 and C2 to disengage, thereby decoupling the foot pedal from the carburetor butterfly valve. However, when switch contacts 56', 56" are closed by the driver, relay coil K6 is energized through by battery "A" through thermal element TE and immediately normally closed contacts 38, 39 open to deenergize relay K2. This, in turn, permits contacts 40, 41 to reclose so that solenoid K1 is actuated to return speed control of the vehicle to the driver. Contacts 54, 55, however will remain closed only until the thermal time of relay element TE has elapsed. For this purpose the thermal time of element TE is established for a time definite so that the driver cannot override the speed control system for a prolonged period. Accordingly, at such time as the delay period of element TE expires, contacts 54, 55 are opened by element TE to deenergize relay K6 and permit contacts 38, 39 to reclose and complete the circuit to relay K2 so that contacts 40, 41 reopen to deenergize throttle control solenoid K1 and declutch plates C1 and C2. In this fashion control of the speed of the vehicle is returned to the control system.

Attention is directed to the fact that contacts 33, 34 and 35 of relay K4 are connected to successive switch segments S1, S2 and S3, respectively. This arrangement serves to prevent the driver from defeating the speed control system by holding down the accelerator pedal at the termination of an override period in order to keep speedometer vane V from returning to S1, that is, if operation is in a 25 m.p.h. zone. Therefore, regardless of the switch segment to which vane V is driven, there is always a ground return path for relay K2 through contact pairs 33, 33', or 34, 34' or 35, 35'. Actually, in practicing the invention, relay K4 would have sufficient contacts to provide this safeguard for all speedometer switch segments. Contacts 49, 50 and 51 of relay K5 are associated with the speedometer switch segments in like fashion to achieve the same result in the 35 m.p.h. zone.

FIG. 3–SPEED MONITORING ARRANGEMENT

Figure 3:
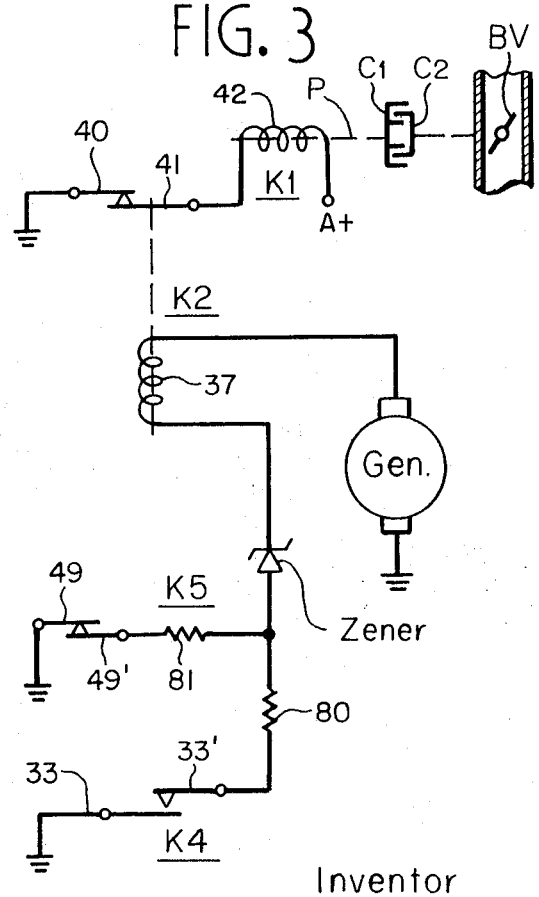
FIG. 3 is a schematic representation of an alternate construction of a speed monitoring arrangement for the control system of FIG. 1.

FIG. 3 discloses another arrangement for monitoring the speed of the vehicle, that is, an alternative for the speedometer switch S of FIG. 1. More particularly, the alternative comprises a generator G which is driven, through a mechanical coupling, by the engine of the vehicle. In this regard the generator may be driven by a belt, a gearing or other suitable arrangement that is coupled to an engine driven source responsive to the speed of the vehicle. In any event generator G develops an output voltage that is proportional to the speed of the car. This voltage is applied to a Zener diode Z which, in the disclosed embodiment, is provided with two paths to ground. One path includes a resistor 80 and contacts 33, 33' of relay K4 while the other path comprises a different higher valued resistor 81 and contacts 49, 49' of relay K5. Since the voltage drop across Zener Z is always a constant the remaining voltage developed by generator G is applied to the resistors depending, of course, upon which of contact pairs 33, 33' or 49, 49' is closed. Assuming that relay K4 is energized (and contacts 33, 33' are closed) then the output of the generator is applied to Z and to resistor 80. If the vehicle is traveling less than 25 m.p.h. then the output of G will be such that no current will flow through coil 37 of relay K2 and therefore normally closed contacts 40—41 will remain closed. However, when the vehicle goes over 25 m.p.h. the voltage generated by G is sufficient to fire the Zener while the excess voltage is sufficient to produce a current flow through resistor 80, and since contacts 33, 33' have already been closed by relay K4's receipt of a 250 c.p.s. command signal (indicative of a 25 m.p.h. speed zone), coil 37 of relay K2 is energized thereby opening contacts 40, 41 to cause clutch plates C1, C2 to open.

In like fashion, to operate in a higher speed limit zone, e.g., 35 m.p.h., the receipt of a 350 c.p.s. command signal by the receiver causes relay K4 to release contacts 33, 33' while causing relay K5 to close contacts 49, 49'. However, the energizing circuit for coil 37 is not completed until the output of the generator is sufficient (that is, indicative of vehicle speed in excess of 35 m.p.h.) to not only fire the Zener but of a magnitude sufficient to drive a current through the higher valued resistor 81. Coil 37 is energized in that situation, contacts 40, 41 open and solenoid K1 is deenergized to declutch plates C1 and C2.

ALTERNATIVE OVERRIDE MECHANISM

Figure 4:
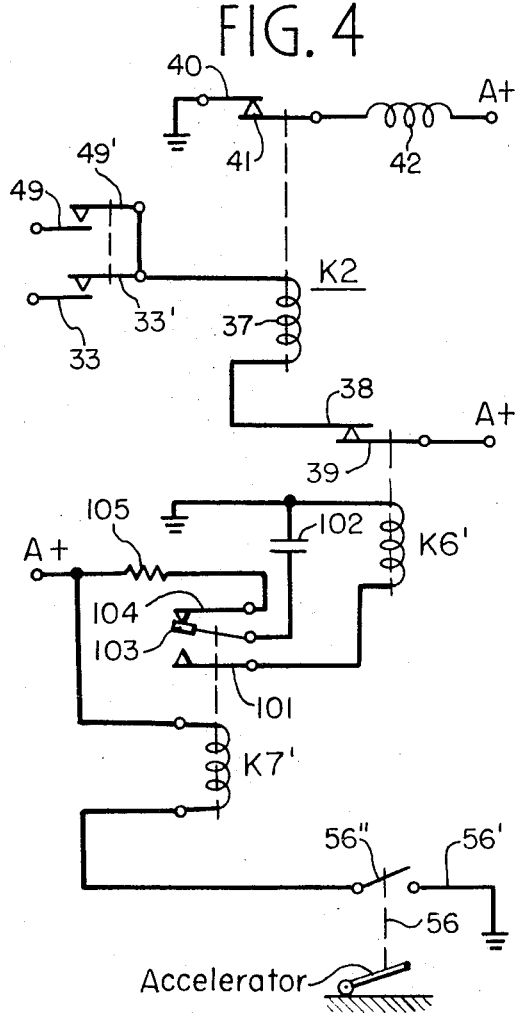
FIG. 4 is a schematic diagram of an alternate override mechanism for use in the speed control system of FIG. 1.

It is recognized that the previously described override mechanism can, alternatively, utilize the charging circuit of FIG. 4 to supplant the thermal control arrangement disclosed in FIG. 1. More particularly, in FIG. 4 the energizing coil for a relay K6' has one terminal maintained at ground potential while the other terminal is connected to a contact 101 of a relay K7'. A capacitor 102 is connected between the grounded terminal of the K6' coil and another contact 103 of relay K7'. A third contact 104 of K7' is connected through a charging resistor 105 to the battery "A." The energizing circuit for relay K7' is completed through accelerator pedal contacts 56', 56''.

In operation, this override system is initiated in the same manner as the arrangement in FIG. 1. Assume the vehicle is operating in a 25 m.p.h. zone (contacts 33, 33' of relay K4 are closed) and the driver depresses the accelerator sharply to close contacts 56', 56'' which causes relay K7' to be energized and close contacts 103, 101. Capacitor 102, which had previously been charged through resistor 105 to a predetermined capacity, now discharges through the coil of relay K6' and at a rate governed by the resistance in K6'. Relay K6' is thus energized for a period proportional to the discharge time constant of capacitor 102 and the resistive component of the relay. While energized, relay K6' holds contacts 38, 39 open to disconnect the "A" battery from relay K2. This, of course, deenergizes K2 and permits contacts 40, 41 to reclose and return speed control to the operator. At such time as capacitor 102 discharges, K6' deenergizes, contacts 38, 39 reclose and the automatic speed control system resumes operation. A function of resistor 105 is to govern the charging time for capacitor 102. In practice resistor 105 should be of a value that will prolong the charging time for capacitor 102. This is necessary in order to prevent the driver from defeating this override arrangement by simply "pumping" the accelerator to keep relay K6' energized by the discharge of capacitor 102.

Latch-type relays are disclosed for use in the subject control system to insure that speed control of the vehicle is always maintained when the vehicle is operated within a speed control area. For example, if the driver parks or if the ignition system is temporarily deenergized while the vehicle is in a control area, then the latch feature of the relay serves as a "memory" so that when the vehicle is again operated its speed will automatically be controlled in accordance with the speed limit assigned that zone. Alternatively, it is appreciated that magnetically held latch relays can be utilized to achieve the same end.

As an additional aid to the driver, a series of indicating lights may be mounted upon the instrument panel of the vehicle. A particular light is assigned to each speed range and it is illuminated upon receipt of a command signal by the vehicle's receiver. Thus the panel light not only informs the driver that he is driving in a speed control area but also tells him the speed limit for that area. Alerted in this fashion the driver is on notice of a speed zone and can take appropriate steps to minimize resort to the emergency "override" control.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A control system for use with a motor-propelled vehicle having adjustable apparatus for controlling the speed of said vehicle, said system comprising:
    means for transmitting a radiofrequency signal modulated by a command signal;
    means borne by said vehicle for receiving said transmitted radio signal;
    a demodulator coupled to said receiving means for detecting said command signal;
    a signal translating circuit comprising a first amplifier responsive to all command signals and a second amplifier responsive only to command signals within a predetermined frequency range;
    said first amplifier having an output circuit coupled to said second amplifier for conditioning said second amplifier for operation upon receipt of a command signal by said first amplifier;
    said second amplifier operative to develop a control signal only upon receipt of a command signal within said predetermined frequency range;
    an electromechanical device coupled to the output of said second amplifier and engageable, upon receipt of said control signal, with said speed control apparatus for restricting the speed of said vehicle to a velocity determined by a parameter of said detected command signal;
    means responsive to the speed of said vehicle for effecting a coupling between the output of said signal-translating circuit and said electromechanical device; and
    means actuable by the operator of said vehicle for decoupling said electromechanical device from said adjustable apparatus for a predeterminable period.

2. A control system as set forth in claim 1 in which said speed control apparatus comprises a valve in the carburetor of said vehicle and an operator-controlled accelerator;
    in which said electromechanical device comprises a clutch assembly, including a solenoid, for mechanically decoupling said accelerator from said carburetor valve upon receipt of said control signal by said solenoid;
    and which further comprises a source of energization for said solenoid; and
    means, including said receiving means and an antenna circuit, for connecting said source to said solenoid to prevent operation of said vehicle should said receiving means or said antenna circuit be disabled.

3. A control system as set forth in claim 1 which further includes a third amplifier responsive only to command signals within a predetermined different frequency range,
    said third amplifier also coupled to the output circuit of said first amplifier to be conditioned for operation upon receipt of a command signal by said first amplifier,
    said third amplifier operative to develop a control signal for said electromechanical device only upon receipt of a command signal within said predetermined different frequency range.

4. A control system as set forth in claim 3 in which said means responsive to the speed of said vehicle comprises a switch having a plurality of positions individually assigned to different speeds for said vehicle, selected ones of said switch positions being connected to the output circuits of assigned ones of said second and third amplifiers, and a displaceable rotor coupled to the propelling shaft of said vehicle for sequentially completing electrical circuits between said switch positions and a reference potential.